(12) United States Patent
Saxena et al.

(10) Patent No.: US 8,893,295 B2
(45) Date of Patent: Nov. 18, 2014

(54) SECURE AND PRIVATE LOCATION

(75) Inventors: Paritosh Saxena, Portland, OR (US);
Nimrod Diamant, Kfar Saba (IL);
David Gordon, Tel Aviv (IL); Benny Getz, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 12/974,936

(22) Filed: Dec. 21, 2010

(65) Prior Publication Data

US 2012/0159172 A1 Jun. 21, 2012

(51) Int. Cl.
*H04L 29/00* (2006.01)
*G06F 21/57* (2013.01)
*H04L 29/06* (2006.01)
*G06F 21/62* (2013.01)
*H04W 12/08* (2009.01)
*H04L 9/08* (2006.01)

(52) U.S. Cl.
CPC .............. *G06F 21/57* (2013.01); *H04L 63/107* (2013.01); *G06F 2221/2107* (2013.01); *G06F 21/6281* (2013.01); *H04W 12/08* (2013.01); *G06F 2221/2119* (2013.01); *G06F 2221/2115* (2013.01); *G06F 2221/2141* (2013.01); *G06F 2221/2111* (2013.01); *H04L 9/0897* (2013.01); *G06F 21/6209* (2013.01)
USPC ........ 726/27; 455/456.1; 455/411; 455/456.3; 455/410; 455/404.2; 380/258; 380/270; 713/189; 713/150; 713/171; 713/176

(58) Field of Classification Search
USPC ................ 455/456.1, 411, 456.3, 410, 404.2, 455/456.4; 380/258, 270; 713/189, 150, 713/171, 176
See application file for complete search history.

(56) References Cited

U.S. PATENT DOCUMENTS

| | | | |
|---|---|---|---|
| 2003/0035544 A1 | 2/2003 | Herle et al. | |
| 2004/0106415 A1 | 6/2004 | Maeda et al. | |
| 2008/0214210 A1* | 9/2008 | Rasanen et al. | 455/456.3 |
| 2008/0232586 A1* | 9/2008 | Takada et al. | 380/255 |
| 2009/0100530 A1 | 4/2009 | Chen | |
| 2009/0144833 A1* | 6/2009 | Gushiken | 726/27 |
| 2010/0210240 A1* | 8/2010 | Mahaffey et al. | 455/411 |

FOREIGN PATENT DOCUMENTS

WO 2012/087582 A2 6/2012
WO 2012/087582 A3 8/2012

OTHER PUBLICATIONS

U.S. Appl. No. 12/895,352, filed Sep. 30, 2010, 18 pages.
International Search Report and Written Opinion received for PCT application No. PCT/US2011/063824, mailed on Jun. 14, 2012, 9 Pages.
International Preliminary Report on Patentability received for PCT Patent Application No. PCT/US2011/063824, mailed on Jul. 4, 2013, 6 pages.

* cited by examiner

*Primary Examiner* — Jeffrey Pwu
*Assistant Examiner* — Michael D Anderson
(74) *Attorney, Agent, or Firm* — Jordan IP Law, LLC

(57) ABSTRACT

Systems and methods of restricting access to mobile platform location information may involve receiving, via a link, location information for a mobile platform at a processor of the mobile platform, and preventing unauthorized access to the location information by an operating system associated with the mobile platform.

21 Claims, 4 Drawing Sheets

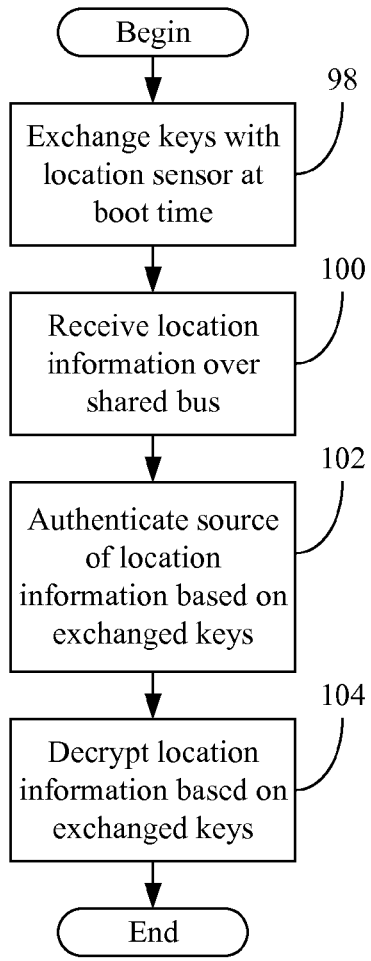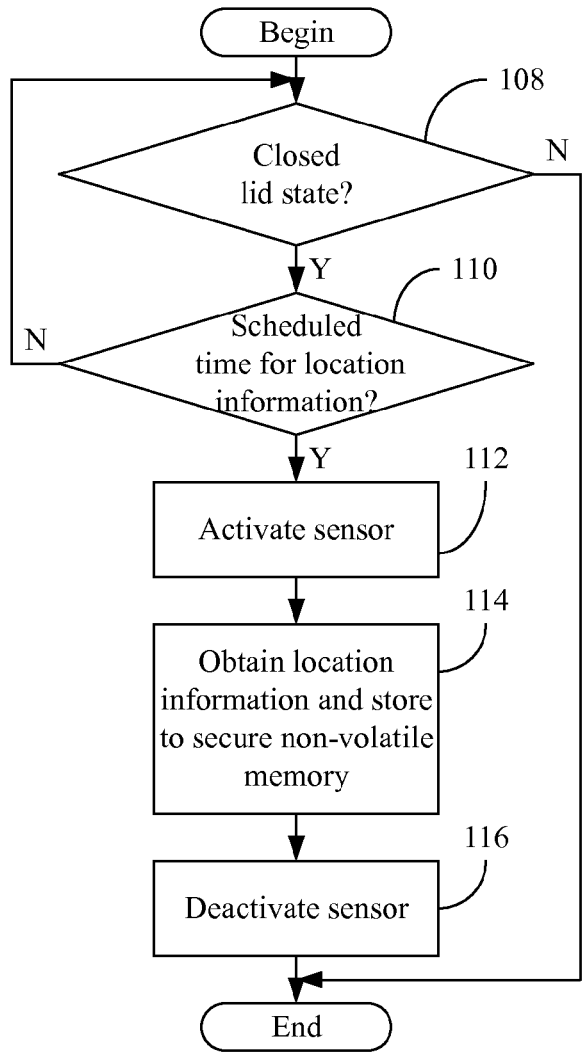
FIG. 4
FIG. 5

SECURE AND PRIVATE LOCATION

BACKGROUND

1. Technical Field

Embodiments generally relate to location based services. More particularly, embodiments relate to providing secure and private access to mobile platform location information.

2. Discussion

As high resolution location technologies may become available on platforms such as netbooks, notebooks and mobile Internet Devices (MIDs), end user privacy concerns can increase. For example, malware resident on the platform might transmit the platform's location to external entities without the user's authorization. Even if the user authorizes release of the location information to certain entities, the possibility of interception of the location information by others may exist. Additionally, location based service providers can experience difficulty in determining the true source of received location information due the possible presence of malicious agents in the host operating system (OS) or in the transmission path of the location information.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a flowchart of an example of a method of exchanging location information over a shared bus according to an embodiment;

FIG. 5 is a flowchart of an example of a method of obtaining location information for a platform that is in a closed lid state according to an embodiment;

DETAILED DESCRIPTION

Embodiments may involve a method that provides for receiving, via a link, location information for a platform at a processor of the platform. The method can also provide for preventing unauthorized access to the location information by an operating system associated with the platform.

Embodiments may also include an apparatus having logic to receive, via a link, location information for a platform at a processor of the platform. The logic can also prevent unauthorized access to the location information by an operating system associated with the platform.

In addition, embodiments can include a platform having a wireless data module to receive an access point identifier. The platform may also include a global positioning system (GPS) sensor, a primary processor, a link coupled to the GPS sensor, and a secondary processor coupled to the link. The secondary processor can have logic to receive, via the link, a GPS location for the platform from the GPS sensor, wherein the GPS location and the access point identifier are to define location information. The logic may also prevent unauthorized access to the location information by an operating system associated with the primary processor.

Figure 1:
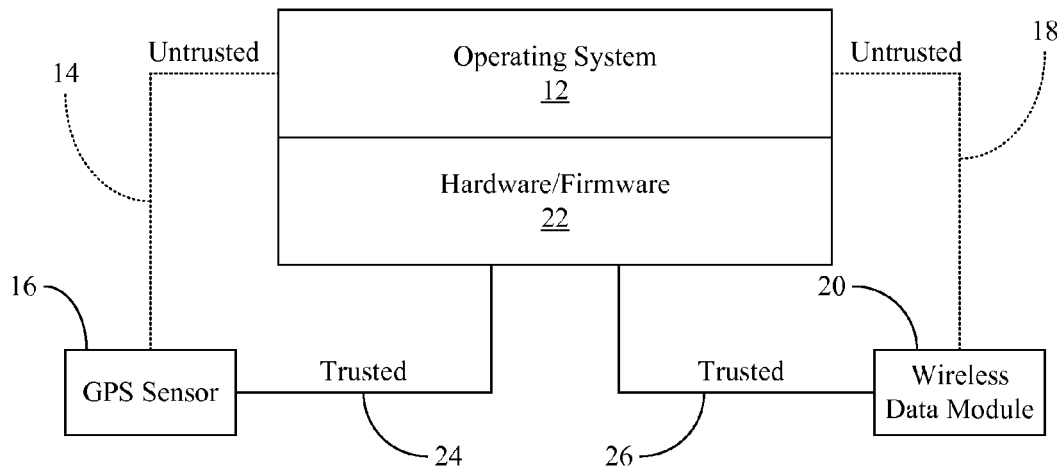
FIG. 1 is a block diagram of an example of an architecture for preventing unauthorized access to location by an operating system associated with a platform according to an embodiment.

Turning now to FIG. 1, an architecture 10 is shown in which secure location based services are enabled for a mobile computing platform. In the illustrated example, an operating system (OS) 12 of the platform has an untrusted link 14 with a global positioning (GPS) sensor (e.g., receiver) 16 and an untrusted link 18 with a wireless data (e.g., Wi-Fi, IEEE 802.11, 1999 Edition) module 20, wherein the GPS sensor 16 and wireless data module 20 can generate and/or obtain location information for the platform (other location sensors such as cell identifier sensors might also provide location information for the platform). Hardware/firmware ("HW/FW") 22 of the platform, however, has trusted links 24, 26, with the GPS sensor 16 and wireless data module 20, respectively. Accordingly, by designating the links 14, 18 as untrusted, the illustrated architecture 10 enables the location information corresponding to the platform to be protected from unauthorized access by potential malware associated with the OS 12. In particular, the trusted links 24, 26 between the HW/FW 22 and the location sensors enable the HW/FW to secure (e.g., encrypt, sign) the location information as well as authenticate requesters of the location information prior to release of the location information to the OS 12 and the requesters.

Figure 2:
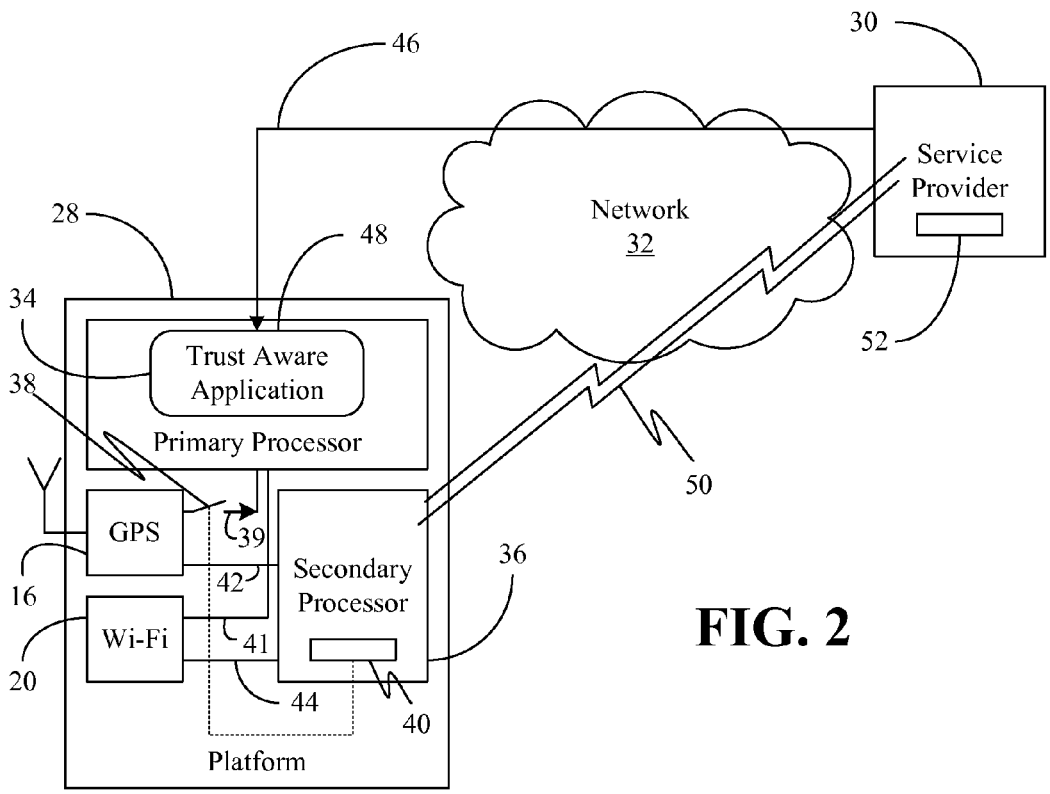
FIG. 2 is a block diagram of an example of an architecture for securing external access to location information according to an embodiment.

FIG. 2 shows a computing platform 28 having location sensors such as a GPS sensor 16 and a wireless data module 20 that provide location information for the platform 28. In the illustrated example, the platform 28 also includes a primary processor 34 and a secondary processor (e.g., embedded microcontroller, management engine/ME, secondary processing unit/SPU) 36, wherein the primary processor 34 can execute an OS (e.g., kernel device drivers, application program interfaces/APIs, etc., not shown), and a normally open switch 38 is disposed between the GPS sensor 16 and the primary processor 34 and/or remainder of the platform 28. The switch 38 could be placed in a path to a port 39 such as a USB (Universal Serial Bus, e.g., USB Specification 2.0, USB Implementers Forum) port or other hardware interface (e.g. COM) port to which the primary processor 34 and/or other components (e.g., network controllers) of the platform 28 might be coupled. The switch 38 could also be a logical switch or even a switching command from the secondary processor 36 to the GPS sensor 16. The secondary processor 36, which can be similar to the above-described HW/FW 22 (FIG. 1), may include logic 40 to prompt a user of the platform 28 with a secure output window (e.g., "sprite" menu that is displayed on the user's screen on top of other content) for authorization to permit direct access to the GPS location information by the OS and the remainder of the platform. Only if such authorization is received will the illustrated logic activate the switch 38.

The logic 40 may also be configured to receive GPS location information from the GPS sensor 16 via a link 42, wherein the link 42 could be either dedicated (e.g., dedicated bus; System Management Bus/SMBus Specification, SBS Implementers Forum, Ver. 2.0, Aug. 3, 2000, etc.) or shared (e.g., shared bus; SMBus, USB, etc.). If the link 42 is a shared link, the logic 40 may exchange one or more keys with the GPS sensor 16 over the link 42 at a boot time associated with the platform 28 prior to the OS assuming control of the platform 28. The GPS sensor 16 may therefore initially submit a public key to the logic 40 and subsequently use a private key to encrypt and sign GPS location information before transmission to the secondary processor 36 over the link 42. The logic 40 may then use the public key obtained at boot time to authenticate and decrypt any location information received over the link 42 to verify that the true source of the location information is the GPS sensor 16. Alternatively, the secondary processor 36 and/or logic 40 could be incorporated into the GPS sensor 16.

The GPS location information may be obtained from the GPS sensor 16 while the platform 28 is in an inactive state (e.g., closed lid, standby, hibernate or shut down state; e.g., ACPI/Advanced Configuration and Power Interface Specification, ACPI Specification, Rev. 4.0, Jun. 16, 2009; S3, S4 or S5 power states). In particular, it has been determined that platforms configured to enter a low power state when the lid (e.g., hinged display) is closed, are often in such a state when the platform is outdoors (e.g., in transit) and in view of the GPS satellite constellation with the GPS receiver disabled. Once the lid is opened and the GPS receiver is enabled, however, the platform may often no longer be in view of the GPS satellite constellation (e.g., indoors).

By periodically activating (e.g., according to a predetermined schedule; every five minutes, etc.) the GPS sensor 16 and obtaining GPS location information while the platform 28 is in the closed lid state, the logic 40 can store the location information for future use when GPS location information may not be available. In one example, the GPS location information and an associated timestamp are stored to a nonvolatile memory location (not shown) that is accessible only by the secondary processor 36. Subsequent use of the stored GPS location information can provide a number of advantages such as faster GPS time to fix (TTF) functionality.

In addition, the logic 40 may communicate with the wireless data module 20 over a link 44. In one example, the wireless data module 20 includes Wi-Fi functionality, wherein the wireless data module 20 obtains access point basic service set identifier (BSSID) information that can be used to determine a location for the platform 28. In such a case, the logic 40 may use C-link (e.g., link 44) and a random seed generated within the secondary processor 36 to scramble the BSSID information obtained by the wireless data module 20 prior to the BSSID information being released to the remainder of the platform 28 through link 41. Thus, the scrambling may provide a similar functionality to that of the switch 38 (e.g., to prevent unauthorized use of the wireless data module as a location sensor).

The illustrated platform 28 also communicates with a service provider 30 over a network 32, wherein the service provider 30 submits a request 46 for location information via the network 32 to a trust aware application 48 executing on a processor of the platform 28 such as the primary processor 34. The primary processor 34 could have one or more processor cores (not shown), where each core may be fully functional with instruction fetch units, instruction decoders, level one (L1) cache, execution units, and so on. The trust aware application 48 might be a Web-based e-commerce application (e.g., PayPal®) or banking application (e.g., online banking), that involves user authentication. Accordingly, the service provider 30 might incorporate location information into the user authentication process associated with the trust aware application 48 so that the response to the request 46 for the location of the platform 28 can be used to verify the identity of the user of the platform 28.

In such a case, the request 46 may include a certificate 52 obtained from a trusted third party and a public key (not shown) associated with the service provider 30, and the logic 40 can authenticate the received certificate 52 with a root certificate stored locally at the secondary processor 36 by the trusted third party. The logic 40 could also prompt a user of the platform 28 (e.g., via sprite menu) for authorization to release the location information to the service provider 30. If the authorization is received, the illustrated logic 40 uses the public key associated with the service provider 30 to encrypt the requested location information and sends the encrypted and signed location information to the service provider 30. The authentication and encryption processes may therefore enable a logical link between the secondary processor 40 and the service provider 30 that can logically be considered an authorized and secure tunnel 50. If the authorization is denied or if the certificate 52 cannot be verified, the logic 40 may withhold the location information from the requesting service provider 30.

Figure 3:
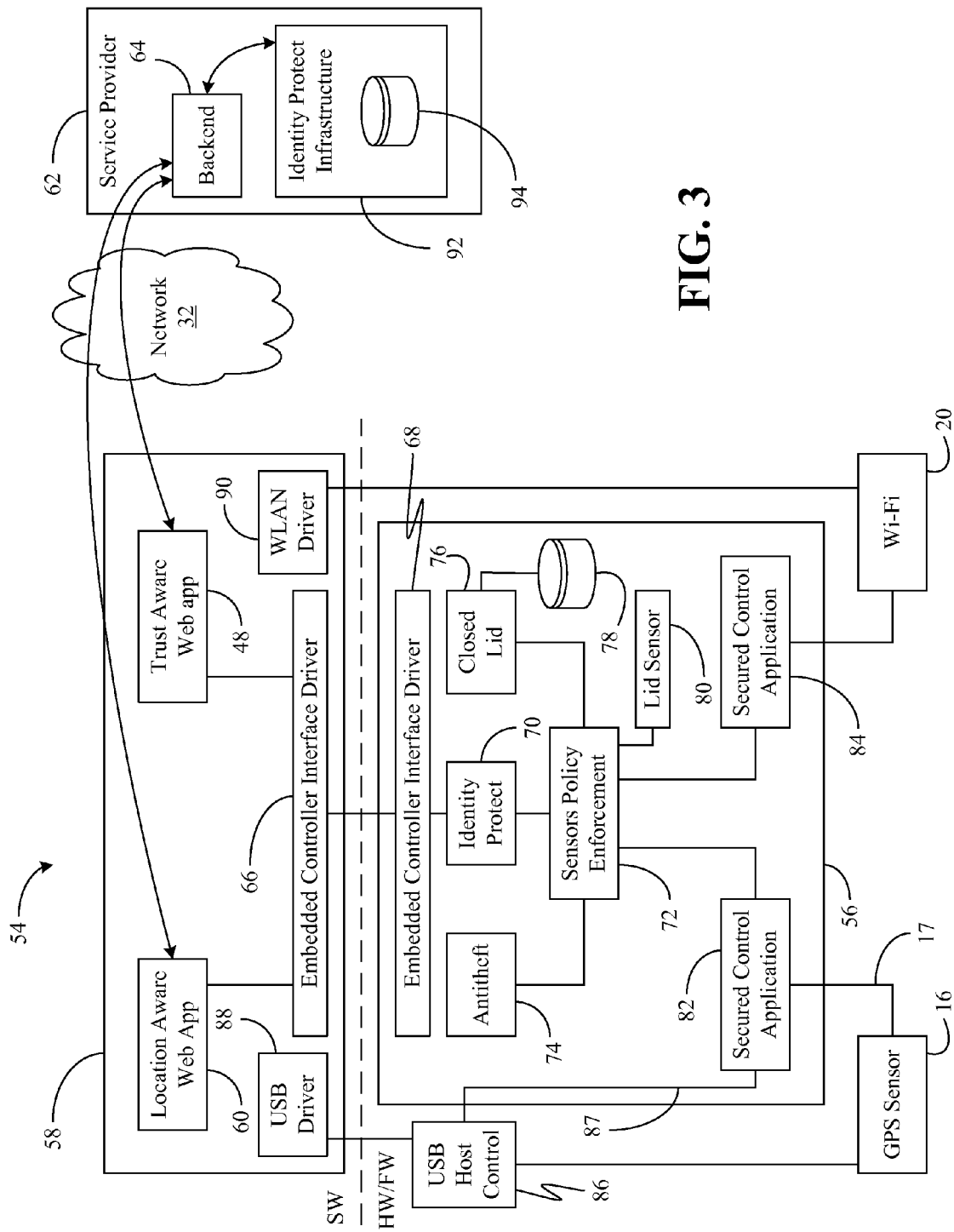
FIG. 3 is a block diagram of an example of a computing platform according to an embodiment.

FIG. 3 shows a computing platform 54 having a secondary processor 56 and software 58 including a trust aware application 48 and a location aware application 60 such as a Web-based mapping application (e.g., Google® maps). The applications 48, 60 may communicate with a backend 64 of a service provider 62 over a network 32 to support secure location based services. The illustrated software 58 also includes an embedded controller interface driver 66 (e.g., HECI driver) to communicate with a corresponding embedded controller interface driver 68 of the secondary processor 56.

The illustrated secondary processor 56, which might be integrated into an input/output (IO) apparatus sometimes referred to as a Southbridge or South Complex of a chipset, includes an identity protection module 70, a sensors policy enforcement application 72, an antitheft module 74, a closed lid module 76, a closed lid data store 78, a lid sensor 80, and secured control applications 82, 84. The secured control application 82 communicates with the GPS sensor 16 and can control direct software access to the GPS location information generated by the GPS sensor 16 via a switch (not shown) disposed within a USB host controller 86, which is controlled by line 87, and wherein the host controller 86 in turn communicates with a USB driver 88 of the software 58. The secured control application 84 communicates with a wireless data module 20 and may scramble access point BSSID information obtained by the wireless data module 20 from a WLAN (wireless local area network) driver 90 of the software 58. An alternate logical switch may be implemented through the private link 17 between the secured control application 82 and the GPS sensor 16.

The illustrated secured control applications 82, 84 also release secure (e.g., encrypted and signed) location information to the sensors policy enforcement application 72, which can enforce any policies (e.g., user defined, default, etc.) regarding access to the secure location information. For example, in response to the hibernation/lid sensor 80 detecting that the platform 54 has entered a closed lid state, the closed lid module 76 may trigger the retrieval of secure GPS location information from the GPS sensor 16 according to a predetermined schedule (e.g., every 5 minutes), and place the retrieved GPS location information in the closed lid data store 78 for later use. Rather than detecting the lid status, the lid sensor 80 may simply represent the logical state of an inactive platform in which an OS application or other software component indicates, via an HECI or other message to the secondary processor 56, that the platform is in an inactive state. Moreover, if the antitheft module 74 determines that the platform 54 may be either lost or stolen, the antitheft module 74 can retrieve secure location information from the wireless data module 20 and/or the GPS sensor 16 via the sensors policy enforcement application 72.

The service provider 62 may also include an identity protection infrastructure 92 that maintains a user configured profile 94, wherein the profile 94 could identify the individuals and/or entities permitted to have access to the location information of the platform 54. Thus, the identity protection module 70 might further constrain access to the location information in conjunction with the identity protection infrastructure 92.

Turning now to FIGS. 4-7, various methods 96, 106, 118, 126, are shown. The methods 96, 106, 118, 126 may be implemented in an embedded microcontroller as fixed-functionality hardware using circuit technology such as application specific integrated circuit (ASIC), complementary metal oxide semiconductor (CMOS) or transistor-transistor logic (TTL) technology, as a set of firmware logic instructions stored in a machine- or computer-readable storage medium of a memory such as random access memory (RAM), read only memory (ROM), programmable ROM (PROM), flash memory, etc., or any combination thereof.

With specific regard to FIG. 4, an exemplary method 96 of securely exchanging location information over a shared bus of a computing platform is shown. Processing block 98 provides for exchanging one or more keys with a location sensor over the shard bus at a boot time associated with the platform. In one example, the location sensor transfers its public key to the embedded microcontroller before an operating system (OS) assumes control of the platform. Location information may be received from the location sensor over the shared bus at block 100, wherein illustrated block 102 authenticates a signature of the source of the location information based on the previously exchanged key(s). Block 104 provides for decrypting the received location information based on the previously exchanged key(s). If the link to the location sensor is a dedicated link, the method 96 might be omitted from the location information retrieval process.

FIG. 5 shows a method 106 of obtaining location information for a computing platform that is in a closed lid state. Processing block 108 provides for determining whether the computing platform is in an inactive (e.g., closed lid) state such as the S3, S4 or S5 low power ACPI states. The determination at block 108 could involve querying a lid sensor 80 (FIG. 3). If the platform is in an inactive (e.g., closed lid) state, a determination may be made at block 110 as to whether a predetermined schedule indicates that it is time to obtain location information for the platform. If not, the illustrated method 106 conducts another check for the closed lid state. Otherwise, block 112 may activate the location sensor, wherein illustrated block 114 provides for obtaining location information and storing the location information to a secure non-volatile memory location (e.g., location that is accessible only by the processor/embedded microcontroller in question). The location sensor may be deactivated at block 116.

Figure 6:
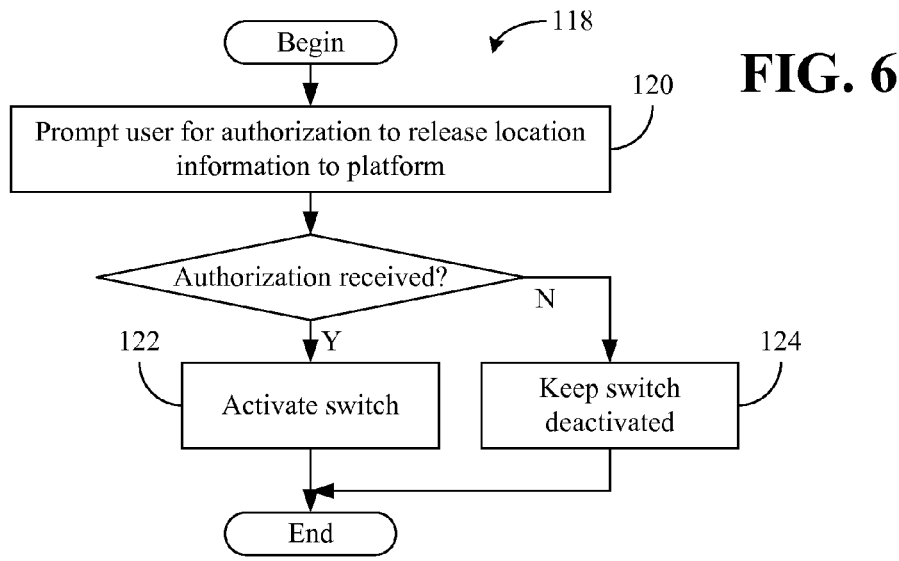
FIG. 6 is a flowchart of an example of a method of obtaining user authorization to release location information to a platform according to an embodiment.

Turning now to FIG. 6, a method 118 of obtaining user authorization to release location information to an operating system of a computing platform is shown. Block 120 provides for prompting a user of the platform for authorization to release location information corresponding to the platform to an operating system associated with the platform. As already noted, the prompting might involve the display of one or more secure sprite menus or in addition to or instead of such a method, use of BIOS (basic input/output system) UI (user interface) menu for user authorization. If the user authorization is received, a normally open switch disposed between a location sensor and a port to the remainder of the platform can be activated at block 122. If the user authorization is not received, illustrated block 124 keeps the switch deactivated. Accordingly, the location information is released to the platform only if user authorization is received in the illustrated example.

Figure 7:
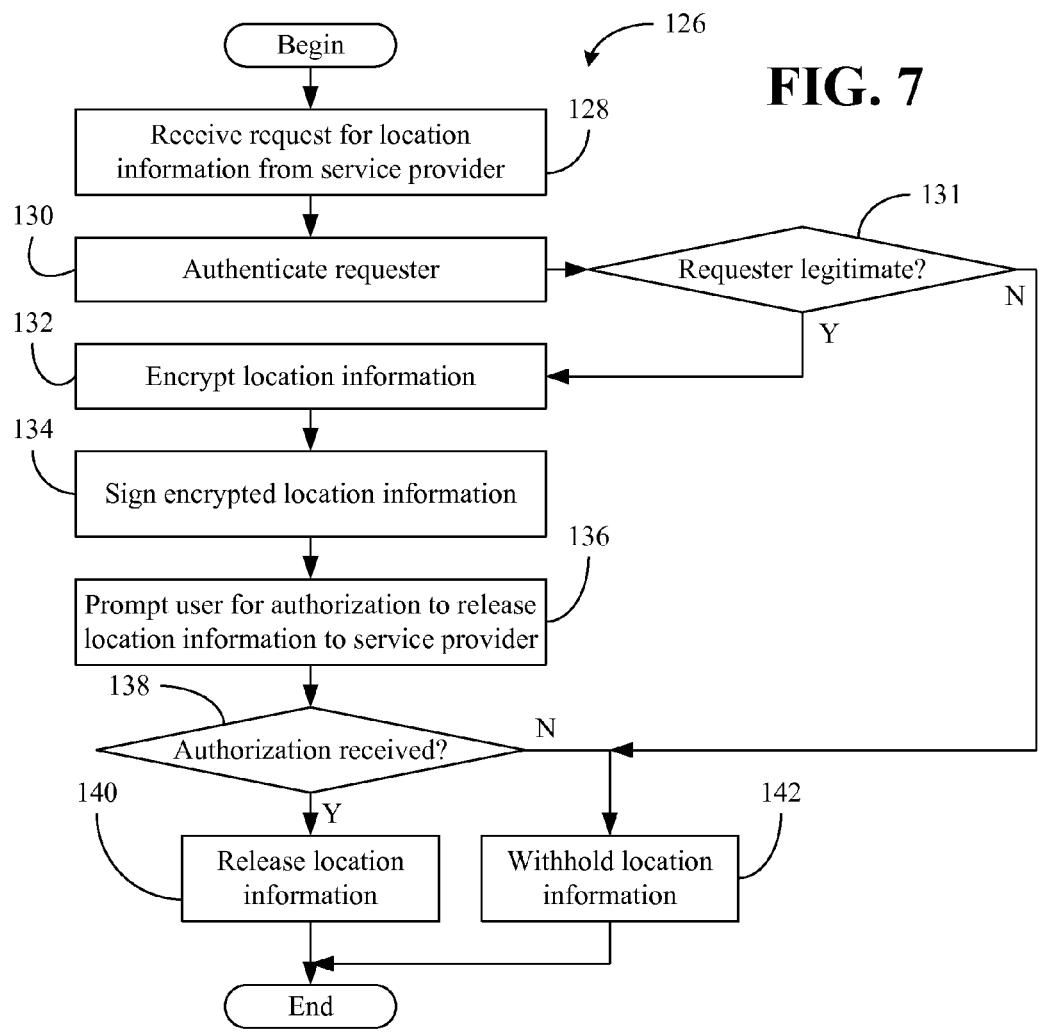
FIG. 7 is a flowchart of an example of a method of obtaining user authorization to release location information to an entity external to a platform according to an embodiment.

FIG. 7 shows a method 126 of obtaining user authorization to release information to a requester external to a computing platform. In particular, a request for location information may be received from a service provider (e.g., requester) at block 128, wherein the request can include a certificate as well as a public key corresponding to the service provider. Illustrated block 130 provides for authenticating the requester based on the certificate. If it is determined at block 131 that the requester is not legitimate, the location information may be withheld at block 142. If the requester is legitimate, block 132 can obtain the requested location information (e.g., from an active location sensor, a "closed lid" storage location accessible only by the secondary processor if current location information is not available, etc.) and encrypt the location information (and "closed lid" timestamp, if appropriate) with the service provider's public key.

In this regard, current location information might not be available at the time of the service provider's request. In such a case, the method 126 may also involve reporting to the service provider that current location information is unavailable and receiving another request for time stamped location information from the service provider. The subsequent request can also be authenticated, wherein location information from the GPS sensor and an associated timestamp may be encrypted in response to the subsequent request. Alternatively, the location information and timestamp could be returned in response to the initial request without a subsequent request being made by the service provider. The encrypted location information (and timestamp, if appropriate), may be signed at block 134 using a certificate obtained from a trusted party and stored locally at an embedded microcontroller of the platform.

Block 136 may provide for prompting a user of the platform for authorization to release location information to the service provider. The prompting could involve identifying the service provider and informing the user, via a sprite menu, the results of the authentication process (e.g., that the identity of the service provider either has or has not been verified). If it is determined at block 138 that authorization has been received, the encrypted and signed location information can be released for transmission to the service provider at block 140. In the case of a timestamp being transmitted along with the location information, the service provider can determine whether to use the location information based on the age of the timestamp. If authorization is not received, illustrated block 142 provides for withholding the location information.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
receiving, via a link, location information for a platform at a secondary processor of the platform; and
preventing unauthorized access to the location information by an operating system associated with the platform, wherein one or more of:
the operating system has direct access to a global positioning system (GPS) location from a GPS sensor in response to an activation of a switch by the secondary processor; or
an access point identifier is scrambled using a seed generated by the secondary processor prior to the access point identifier being released to the operating system.

2. The method of claim 1, wherein the link includes a dedicated bus.

3. The method of claim 1, wherein the link includes a shared bus and the method further includes:
exchanging one or more keys between the GPS sensor and the secondary processor over the shared bus associated with the platform prior to the operating system assuming control of the platform;
authenticating a signature of the GPS sensor based on the one or more keys; and
decrypting the GPS location based on the one or more keys.

4. The method of claim 1, wherein the method includes:
prompting a user of the platform for authorization to permit the direct access by the operating system to the GPS location; and
activating the switch if the authorization is received, wherein the switch is disposed between the GPS sensor and a hardware port to the platform.

5. The method of claim 1, further including:
receiving a request for the location information from a service provider external to the platform;
authenticating the request;
encrypting the location information based on one or more keys associated with the service provider;
signing the encrypted location information;
prompting a user of the platform for authorization to release the encrypted and signed location information; and
releasing the encrypted and signed location information to the platform if the authorization is received.

6. The method of claim 1, further including:
activating the GPS sensor of the platform if the platform is in an inactive state based on a predetermined schedule;
requesting the location information from the GPS sensor if the GPS sensor is activated in response to the predetermined schedule; and
storing the location information and an associated timestamp to a non-volatile memory that is accessible only by the processor.

7. The method of claim 1, wherein the location information includes an access point basic service set identifier (BSSID).

8. An apparatus comprising:
logic to,
receive, via a link, location information for a platform at a secondary processor of the platform, and
prevent unauthorized access to the location information by an operating system associated with the platform, wherein one or more of:
the operating system is to have direct access to a global positioning system (GPS) location from a GPS sensor in response to an activation of a switch by the secondary processor; or
an access point identifier is to be scrambled using a seed generated by the secondary processor prior to the access point identifier being released to the operating system.

9. The apparatus of claim 8, wherein the link includes a dedicated bus.

10. The apparatus of claim 8, wherein the link includes a shared bus and the logic is to,
exchange one or more keys with the GPS sensor over the shared bus associated with the platform,
authenticate a signature of the GPS sensor based on the one or more keys, and
decrypt the GPS location based on the one or more keys.

11. The apparatus of claim 8, further including a switch disposed between the GPS sensor and a port to the platform, wherein the logic is to,
prompt a user of the platform for authorization to permit direct operating system access to the GPS location, and
activate the switch if the authorization is received.

12. The apparatus of claim 8, wherein the logic is to,
receive a request for the location information from a service provider external to the platform,
authenticate the request,
encrypt the location information based on one or more keys associated with the service provider,
sign the encrypted location information, prompt a user of the platform for authorization to release the encrypted and signed location information, and release the encrypted and signed location information to the platform if the authorization is received.

13. The apparatus of claim 8, wherein the logic is to, activate the GPS sensor of the platform if the platform is in an inactive state based on a predetermined schedule, request the location information from the GPS sensor if the GPS sensor is activated, and store the location information and an associated timestamp to a non-volatile memory that is accessible by the processor.

14. The apparatus of claim 13, wherein the logic is to, receive a first request for the location information from a service provider external to the platform, authenticate the first request, report to the service provider that current location information is unavailable, receive a second request for time stamped location information from the service provider, authenticate the second request, encrypt the location information from the GPS sensor and the associated timestamp, sign the encrypted location information and associated timestamp, and send the encrypted and signed location information and associated timestamp to the service provider.

15. The apparatus of claim 8, wherein the location information is to include an access point basic service set identifier (BSSID).

16. A platform comprising:

a wireless data module to receive an access point identifier;

a global positioning system (GPS) sensor;

a primary processor to execute an operating system;

a link coupled to the GPS sensor; and a secondary processor coupled to the link, the secondary processor including logic to, receive, via the link, a GPS location for the platform from the GPS sensor, wherein the GPS location and the access point identifier are to define location information, and prevent unauthorized access to the location information by the operating system associated with the primary processor, wherein one or more of:

the operating system is to have direct access to the GPS location from the GPS sensor in response to an activation of a switch by the secondary processor; or the access point identifier is to be scrambled using a seed generated by the secondary processor prior to the access point identifier being released to the operating system.

17. The platform of claim 16, wherein the link includes a dedicated bus.

18. The platform of claim 16, wherein the link includes a shared bus and the logic is to, exchange one or more keys with the GPS sensor over the shared bus associated with the platform;

authenticate a signature of the source of the GPS location based on the one or more keys; and decrypt the GPS location based on the one or more keys.

19. The platform of claim 16, further including a switch disposed between the GPS sensor and the primary processor, wherein the logic is to, prompt a user of the platform for authorization to permit direct operating system access to the GPS location, and activate the switch if the authorization is received.

20. The platform of claim 16, wherein the logic is to, receive a request for the location information from a service provider external to the platform, and authenticate the request, encrypt the location information based on one or more keys associated with the service provider, sign the encrypted location information, prompt a user of the platform for authorization to release the encrypted and signed location information, and release the encrypted and signed location information to the platform if the authorization is received.

21. The platform of claim 16, further including a non-volatile memory that is accessible by the secondary processor, wherein the logic is to, activate the GPS sensor if the platform is in an inactive state based on a predetermined schedule, request the location information from the GPS sensor if the GPS sensor is activated, and store the location information and an associated timestamp to the non-volatile memory.

* * * * *